United States Patent
Nakano (10) Patent No.: US 10,099,328 B2
(45) Date of Patent: Oct. 16, 2018

(54) WORKPIECE AUTO-CENTERING APPARATUS AND AUTO-CENTERING METHOD

(71) Applicant: NSK LTD., Tokyo (JP)

(72) Inventor: Makoto Nakano, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/315,815

(22) PCT Filed: May 22, 2015

(86) PCT No.: PCT/JP2015/064828
§ 371 (c)(1),
(2) Date: Dec. 2, 2016

(87) PCT Pub. No.: WO2015/186542
PCT Pub. Date: Dec. 10, 2015

(65) Prior Publication Data
US 2017/0120404 A1    May 4, 2017

(30) Foreign Application Priority Data

Jun. 4, 2014   (JP) .................................. 2014-116131

(51) Int. Cl.
*B23Q 17/22*    (2006.01)
*B23Q 1/38*    (2006.01)
(Continued)

(52) U.S. Cl.
CPC ................. *B23Q 1/38* (2013.01); *B23Q 3/18* (2013.01); *B23Q 3/183* (2013.01); *B23Q 16/001* (2013.01)

(58) Field of Classification Search
CPC ........... B23Q 3/18; B23Q 15/24; B23Q 17/22
(Continued)

(56) References Cited

U.S. PATENT DOCUMENTS

| 4,064,659 A | * | 12/1977 | Ulivi | ........................ | B23Q 3/18 |
| | | | | | 198/345.1 |
| 4,612,946 A | * | 9/1986 | Noh | ........................ | B23P 19/06 |
| | | | | | 134/140 |

(Continued)

FOREIGN PATENT DOCUMENTS

| CN | 2552630 Y | 5/2003 |
| CN | 2829982 Y | 10/2006 |

(Continued)

OTHER PUBLICATIONS

Search Report dated Aug. 18, 2015 issued by the International Searching Authority in counterpart International Patent Application No. PCT/JP2015/064828 (PCT/ISA/210).

(Continued)

*Primary Examiner* — Gregory W Adams
(74) *Attorney, Agent, or Firm* — Sughrue Mion, PLLC (57) ABSTRACT

An air bearing slide (20) arranged on a rotational table (11) includes a movable table (40) that has a workpiece placement surface (42a) and that floats due to pressure of compression air to be movable horizontally in any direction. A workpiece auto-centering apparatus includes: a plurality of stopper apparatuses (30) that include an abutment portion (31a) against which a workpiece W can abut to center the workpiece W, and a pressing apparatus that presses the workpiece (W) such that the workpiece (W) abuts against the abutment portion (31a) of the stopper apparatuses (30). Thus, the workpiece auto-centering apparatus and auto-centering method have a simple configuration and can perform a workpiece centering operation in short cycle time.

14 Claims, 5 Drawing Sheets

(51) Int. Cl.
*B23Q 3/18* (2006.01)
*B23Q 16/00* (2006.01)

(58) Field of Classification Search
USPC ....... 198/345.1, 403; 269/303, 319, 320, 73;
33/1 M, 645; 384/100, 12; 406/87, 88;
414/676, 755, 757, 771, 775, 779, 781,
414/782, 936
See application file for complete search history.

(56) References Cited

U.S. PATENT DOCUMENTS

| | | | | |
|---|---|---|---|---|
| 4,685,206 A | * | 8/1987 | Kobayashi | B23P 19/002 |
| | | | | 198/394 |
| 4,784,377 A | * | 11/1988 | Woodward | B25B 11/005 |
| | | | | 269/21 |
| 4,787,814 A | | 11/1988 | Vaerman | |
| 5,014,440 A | | 5/1991 | Lessi et al. | |
| 5,031,547 A | * | 7/1991 | Hirose | B23Q 1/4866 |
| | | | | 108/137 |
| 5,123,174 A | * | 6/1992 | Noguchi | G01B 5/0004 |
| | | | | 248/913 |
| 7,257,902 B2 | * | 8/2007 | Gao | G03F 7/70716 |
| | | | | 33/1 M |
| 7,547,181 B2 | * | 6/2009 | Fukatsu | H01L 21/67051 |
| | | | | 414/609 |
| 8,008,815 B2 | * | 8/2011 | Ro | B23Q 1/62 |
| | | | | 310/12.05 |
| 8,388,298 B2 | * | 3/2013 | Ikehata | B65G 7/04 |
| | | | | 414/779 |
| 2010/0164305 A1 | | 7/2010 | Frankel | |
| 2013/0207332 A1 | * | 8/2013 | Li | B23Q 1/25 |
| | | | | 269/73 |
| 2014/0033854 A1 | * | 2/2014 | Hosaka | B23Q 1/621 |
| | | | | 74/490.09 |

FOREIGN PATENT DOCUMENTS

| | | | |
|---|---|---|---|
| CN | 201720356 U | | 1/2011 |
| CN | 102272914 A | | 12/2011 |
| CN | 103072502 A | | 5/2013 |
| CN | 103507128 A | | 1/2014 |
| JP | 58114835 | * | 7/1983 |
| JP | 60238258 A | * | 11/1985 |
| JP | 1-210240 A | | 8/1989 |
| JP | 7-1187 A | | 1/1995 |
| JP | 2003083741 A | | 3/2003 |
| JP | 2006-32661 A | | 2/2006 |
| JP | 2011-83829 A | | 4/2011 |
| JP | 2011-194530 A | | 10/2011 |
| JP | 2011194530 A | * | 10/2011 |
| JP | 2013-71230 A | | 4/2013 |

OTHER PUBLICATIONS

Written Opinion dated Aug. 18, 2015 issued by the International Searching Authority in counterpart International Patent Application No. PCT/JP2015/064828 (PCT/ISA/237).
Communication dated Sep. 5, 2017, from the Japanese Patent Office in counterpart application No. 2014-116131.
Communication issued by the State Intellectual Property Office of P.R. China dated Apr. 10, 2018 in counterpart Chinese Patent Application No. 201580029982.X.

\* cited by examiner

WORKPIECE AUTO-CENTERING APPARATUS AND AUTO-CENTERING METHOD

TECHNICAL FIELD

The present invention relates to a workpiece auto-centering apparatus and an auto-centering method, and more particularly to a workpiece auto-centering apparatus and an auto-centering method for automatically correcting misalignment of a workpiece.

BACKGROUND ART

When performing various types of inspection and measurement by rotating a workpiece, such as a bearing ring, a so-called "centering" operation which makes a center of the workpiece coincide with a rotational shaft of a rotational measurement table is required. Particularly, in the case of large and heavy workpieces, frictional force between the measurement table and the workpiece becomes large, and the workpiece will deform even if it is pressed to correct its position. Therefore, there are difficulties in centering.

Conventionally, the workpiece auto-centering apparatus disclosed in Patent Document 1 includes a rotational reference table, a movable table placed on the reference table for fixing the workpiece, fixed switching means for switching the movable table relative to the reference table between a fixed state and a non-fixed state by hydraulic pressure, floating means for floating the movable table from the reference table by fluid pressure, a measuring apparatus for measuring a misalignment direction and a misalignment amount of the workpiece fixed on the movable table, and a horizontal moving mechanism for moving the workpiece in a horizontal direction together with the movable table. The workpiece auto-centering apparatus performs centering by moving the workpiece based on the misalignment direction and the misalignment amount of the workpiece measured by the measuring apparatus.

Moreover, there has been known a workpiece auto-centering apparatus including a plate which is rotatable around a reference axis and on which the workpiece is placed, a measuring device for measuring a misalignment direction and a misalignment amount of the workpiece, a pusher for moving the plate by pushing the same, and centering means for making an axis of the workpiece coincide with the reference axis by controlling the rotation of the plate and the pusher according to the measurement result of the measuring device (for example, see Patent Document 2).

PRIOR ART DOCUMENT

Patent Document

Patent Document 1: JP-A-2011-194530
Patent Document 2: JP-A-2011-83829

SUMMARY OF THE INVENTION

Problems to be Solved by the Invention

However, the auto-centering apparatus disclosed in Patent Document 1 has a complex configuration where hydraulic pressure is used for the fixed switching means, air pressure is used for the floating means. In addition, the horizontal moving mechanism moves the movable table horizontally only in a predetermined direction. Therefore, when centering a workpiece, the reference table is rotated based on a misalignment direction of the workpiece measured by the measuring apparatus. Then, the workpiece together with the movable table are horizontally moved by the horizontal moving mechanism by the measured misalignment amount, which leads to longer cycle time.

In the auto-centering apparatus of Patent Document 2, a mechanism for floating the plate with respect to a spindle table operates by hydraulic pressure. Therefore, a working oil recovery mechanism is required, and the apparatus becomes large and complex. In addition, the working oil may pollute the operating environment, and there is room for improvement. In the auto-centering apparatus disclosed in Patent Document 2, it is necessary to rotate the plate, so that a pushing direction of the pusher for pushing a workpiece coincides with a misalignment direction of the workpiece, which leads to longer cycle time.

The present invention has been made in consideration of the above-mentioned problem, and an object of the present invention is to provide a workpiece auto-centering apparatus and auto-centering method which has a simple configuration and can perform a workpiece centering operation in shorter cycle time.

Method for Solving the Problem

The above-mentioned object of the present invention is achieved by the following configuration.
(1) A workpiece auto-centering apparatus for centering a workpiece includes:
a rotational table that is driven to rotate; and
at least one work table that is arranged on the rotational table and on which the workpiece is placed,
wherein the work table includes a movable table that has a workpiece placement surface for placing the workpiece thereon and that floats due to pressure of compression air to be movable horizontally in any direction.
The workpiece auto-centering apparatus further includes:
at least one stopper apparatus that includes an abutment portion against which the workpiece abuts to position the workpiece; and
a pressing apparatus that presses the workpiece or the movable table such that the workpiece abuts against the abutment portion of the stopper apparatus.
(2) In the workpiece auto-centering apparatus according to (1), a plurality of stopper apparatuses are provided at intervals of 90 degrees in a circumferential direction within a plane orthogonal to a rotational shaft of the rotational table.
(3) In the workpiece auto-centering apparatus according to (1) or (2), a position of the abutment portion is adjustable according to an outer diameter of the workpiece.
(4) In the workpiece auto-centering apparatus according to any of (1) to (3), wherein the work table includes an origin returning mechanism that enables the movable table to return to a predetermined origin position.
(5) A workpiece auto-centering method using the workpiece auto-centering apparatus according to any of (1) to (4) includes:
a step of supplying compression air to the work table to float the movable table by pressure of the compression air;
a step of placing the workpiece onto the workpiece placement surface of the movable table;
a step of pressing the workpiece or the movable table by the pressing apparatus to move the workpiece together with the movable table in a horizontal direction such that the workpiece abuts against the abutment portion of the stopper apparatus, so as to center the workpiece; and a step of stopping supplying the compression air to the work table to lower the movable table.

(6) The workpiece auto-centering method according to (5), wherein the work table includes an origin returning mechanism that enables the movable table to return to a predetermined origin position, the workpiece auto-centering method further including:

a step of lifting a positioning pin of the origin returning mechanism and returning the movable table to the predetermined origin position after the step of floating the movable table; and a step of lowering the positioning pin of the origin returning mechanism before or after the step of placing the workpiece.

Effect of the Invention

According to the workpiece auto-centering apparatus of the present invention, the work table includes the movable table that has the workpiece placement surface for placing the workpiece thereon and that floats due to the pressure of compression air to be movable horizontally in any direction. The workpiece auto-centering apparatus further includes at least one stopper apparatus that includes an abutment portion against which the workpiece abuts to position the workpiece, and a pressing apparatus that presses the workpiece or the movable table such that the workpiece abuts against the abutment portion of the stopper apparatus. Therefore, the workpiece auto-centering apparatus of the present invention causes the movable table to float by the pressure of the compression air, so that even a large and heavy workpiece can be moved horizontally with an extremely low frictional force. In addition, compared with an auto-centering apparatus using hydraulic pressure, the workpiece auto-centering apparatus of the present invention is unlikely to deteriorate the operating environment and can be configured by a simple configuration. The workpiece auto-centering apparatus performs centering by causing the workpiece to abut against the stopper apparatus without measuring the misalignment amount and direction, thereby shortening the cycle time.

Furthermore, the workpiece auto-centering method according to the present invention includes the step of supplying the compression air to the work table to float the movable table by the pressure of the compression air, the step of placing the workpiece onto the workpiece placement surface of the movable table, the step of pressing the workpiece or the movable table by the pressing apparatus to move the workpiece together with the movable table in the horizontal direction such that the workpiece abuts against the abutment portion of the stopper apparatus, so as to center the workpiece, and the step of stopping supplying the compression air to the work table to lower the movable table. Therefore, the workpiece auto-centering method of the present invention causes the movable table to float by the pressure of the compression air, so that even the large and heavy workpiece can be moved horizontally at the extremely low frictional force. In addition, compared with an auto-centering apparatus using hydraulic pressure, the workpiece auto-centering apparatus of the present invention is unlikely to deteriorate the operating environment and can be configured by the simple configuration. The workpiece auto-centering apparatus performs centering by causing the workpiece to abut against the stopper apparatus without measuring the misalignment amount and direction, thereby shortening the cycle time.

DETAILED DESCRIPTION OF EMBODIMENTS

Hereinafter, a workpiece auto-centering apparatus and a workpiece auto-centering method according to an embodiment of the present invention will be described with reference to the accompanying drawings.

Figure 1:
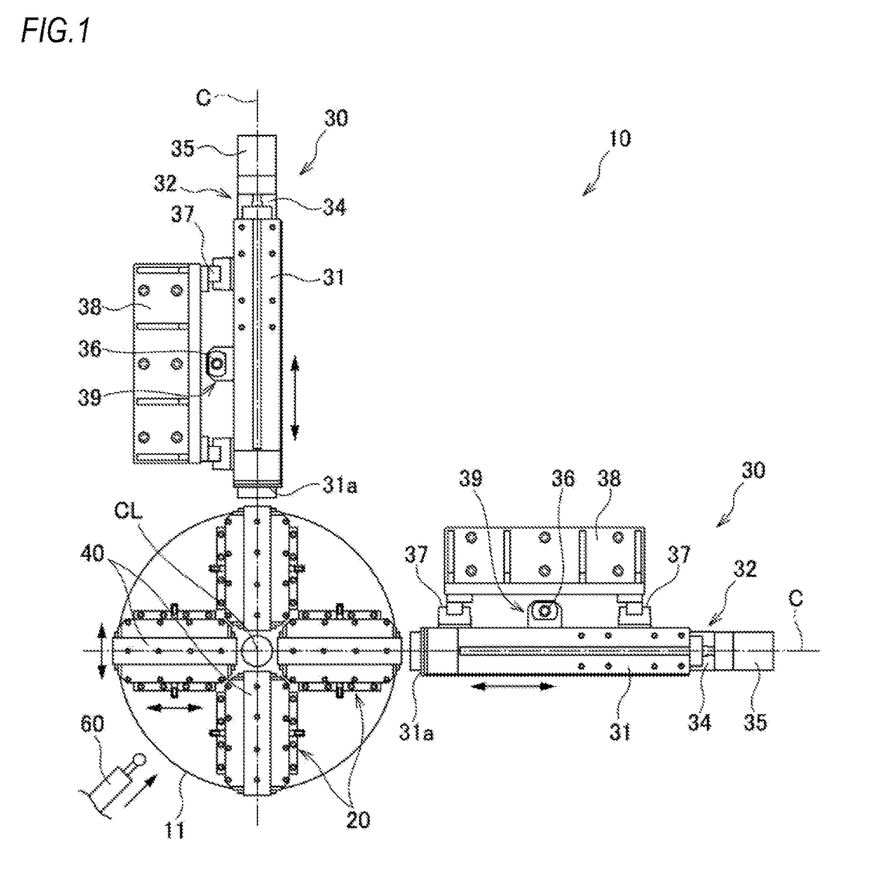
FIG. 1 is a plan view showing a configuration of a workpiece auto-centering apparatus according to the present invention.
Figure 2:
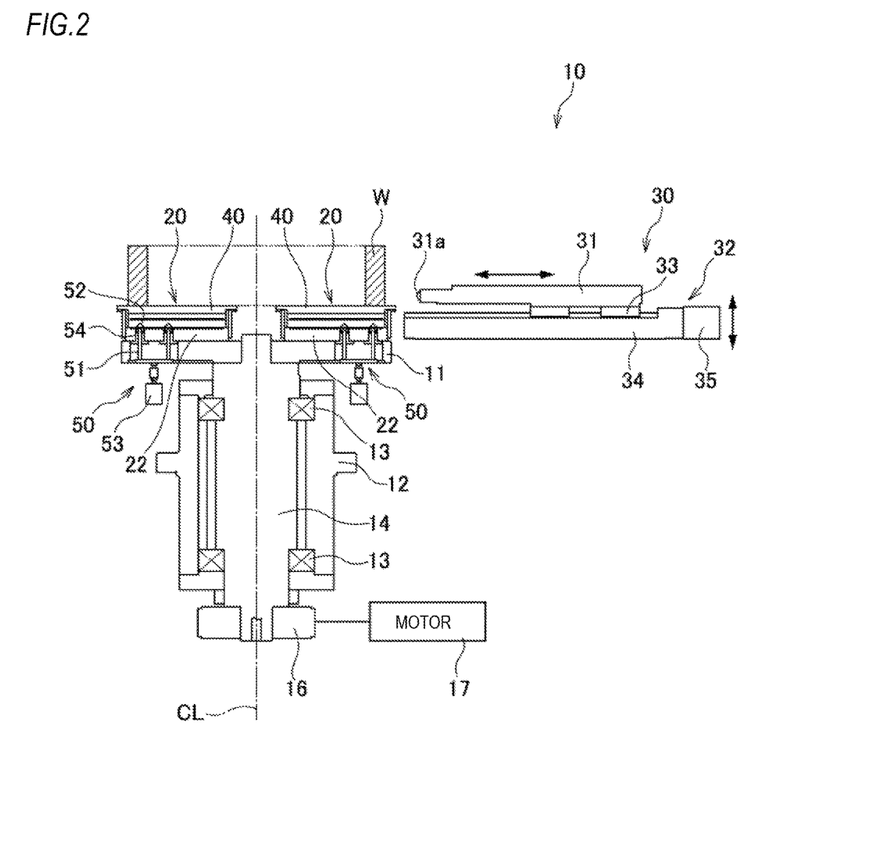
FIG. 2 is a longitudinal sectional view of the workpiece auto-centering apparatus in FIG. 1.

As shown in FIG. 1 and FIG. 2, a workpiece auto-centering apparatus 10 includes a rotational table 11 that is driven to rotate by a servo motor (drive apparatus) 17, a plurality of (four in the present embodiment) air bearing slides (work tables) 20 on which workpieces W are placed, a plurality of (two in the present embodiment) stopper apparatuses 30 for positioning the workpieces W, respectively, and a pressing apparatus 60 configured by robots or the like for pressing the workpieces W placed on the air bearing slides 20 to move the workpieces W in the horizontal direction.

The rotational table 11 is fixed on an upper end of a rotational shaft 14 which is supported to be freely rotatable with respect to a housing 12 via a plurality of bearings 13. A lower end of the rotational shaft 14 is provided with a power transmission member 16 through which the driving power from the servo motor 17 is transmitted to the rotational shaft 14. The rotational table 11 is rotated clockwise and counterclockwise around a center line CL by the driving power from the servo motor 17.

Figure 3A:
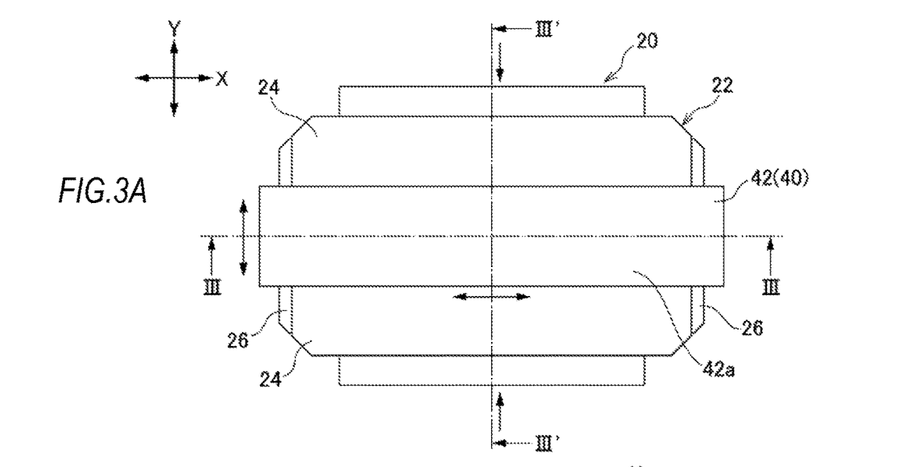
FIG. 3A is a plan view of a work table.
Figure 3B:
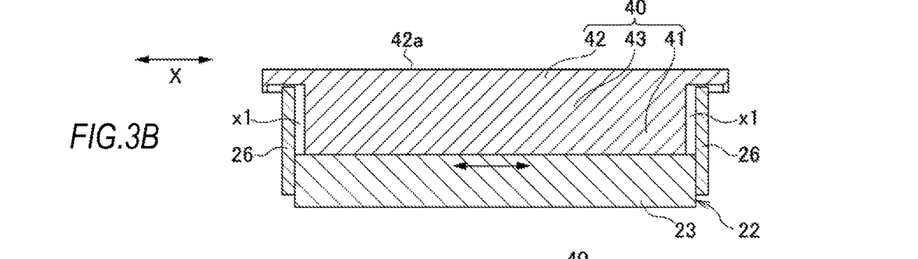
FIG. 3B is a sectional view along a line III-III of FIG. 3A.
Figure 3C:
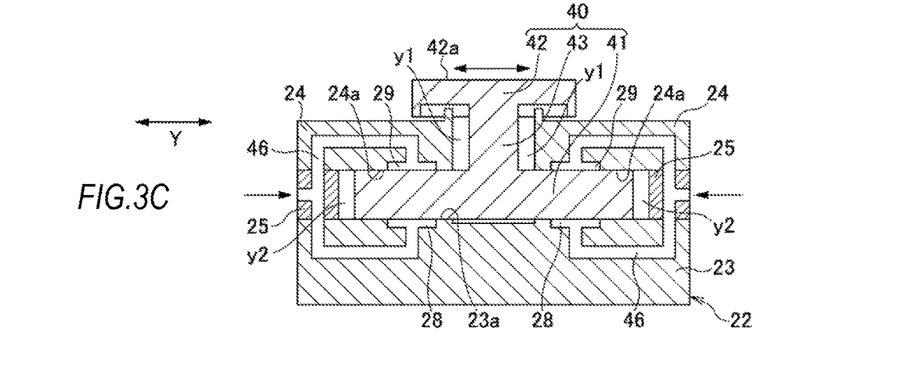
FIG. 3C is a sectional view along a line III'-III' of FIG. 3A.

Four air bearing slides 20 are arranged at intervals of 90 degrees around the center line on the rotational table 11. For example, bearing rings and other workpieces W are placed on the air bearing slides 20. Referring to FIG. 3, each air bearing slide 20 includes a substantially cuboid shaped table body 22 fixed on the rotational table 11, and a movable table 40 that is arranged to float due to the pressure of compression air to be movable horizontally in any direction with respect to the table body 22.

The movable table 40 includes a substantially cuboid shaped base portion 41 that is housed within the table body 22 and includes an upper surface and a lower surface for receiving pressure of compression air, a substantially cuboid shaped workpiece placement portion 42 that is provided above the table body 22 and has a workpiece placement surface 42a on its upper surface; and a connecting portion 43 that connects the base portion 41 and the workpiece placement portion 42 at a center portion of the shorter side direction of the base portion 41. The longer sides of the base portion 41 and the connecting portion 43 have substantially equal lengths, while the longer side of the workpiece placement portion 42 is longer than those of the base portion 41 and the connecting portion 43. As shown in FIGS. 3A-C, the longer side direction of the movable table 40, namely the longer side direction of the base portion 41, the workpiece placement portion 42 and the connecting portion 43, is referred as X direction, and the shorter side direction of the movable table 40, namely the shorter side direction of the base portion 41, the workpiece placement surface 42 and the connecting portion 43, is referred as Y direction.

The table body 22 includes a lower side body portion 23 and a pair of upper side body portions 24, 24, respectively face the lower surface and the upper surface of the base portion 41 of the movable table 40, a pair of shorter side walls 25, 25 that is sandwiched by the lower side body portion 23 and the pair of upper side body portion 24, 24 and cover a side face of the base portion 41 in Y direction, and a pair of longer side walls 26, 26 that is fixed on an end face of the lower side body portion 23 in X direction and that cover side surfaces of the base portion 41 and the connecting portion 43 in X direction. The pair of upper side body portions 24, 24 are arranged in parallel along X direction in a mutually separated state while the connecting portion 43 of the movable table 40 is housed therebetween.

Clearances y1 and clearances y2 in Y direction are respectively provided between the pair of the upper side body portions 24, 24 and the connecting portion 43 and between the shorter side walls 25 and the base portion 41. Furthermore, clearances x1 in X direction are each provided between the longer side walls 26, and the connecting portion 43 and the base portion 41. Thus, the movable table 40 is arranged to be freely movable horizontally in the range of the clearances y1 and y2 (in more detail, the smaller one of y1 and y2) in Y direction and the clearances x1 in X direction with respect to the table body 22.

The thickness of the base portion 41 is less than that of the shorter side wall 25, and the base portion 41 is arranged between the upper surface 23a of the lower side body portion 23 and the lower surface 24a of the pair of the upper side body portions 24 with a slight clearance in an upper-lower direction.

Grooves 28, 29 for discharging compression air are formed on the surface 23a of the lower side body portion 23 and the lower surface 24a of the pair of the upper side body portions 24. The grooves 28, 29 are in communication with air passages 46 provided in the lower side body portion 23, the upper side body portions 24, and the shorter side walls 25. The air passages 46 are further connected with an air supply hole (not shown) that passes through the rotational shaft 14 in the axial direction and in communication with an air passage (not shown) connected with an air compressor (not shown).

Compression air supplied by the air compressor through the air passages 46 is discharged at the grooves 28, 29, so that a hydrostatic bearing is configured between the table body 22 and the movable table 40, and the movable table 40 is floated with respect to the table body 22 to be movable horizontally in any direction with low frictional resistance. Preferably, a throttle such as an orifice or a variable throttle using for example a leaf spring is provided in the air passages 46 in an appropriate position such that the compressed air is stably supplied to the grooves 28, 29.

Incidentally, as long as the hydrostatic bearing is configured by the movable table 40 and the table body 22, and the movable table 40 onto which the workpiece W is placed is horizontally movable in any direction, the present embodiment is not limited thereto.

Furthermore, as shown in FIG. 2, for each air bearing slide 20, the workpiece auto-centering apparatus 10 includes an origin returning mechanism 50 that returns the movable table 40 to a predetermined origin position. The origin returning mechanism 50 includes a pair of positioning pins 51 that slides in the holes of the rotational table 11 and bushes 54 fixed in the holes of the table body 22, and that have front ends formed into tapered, a pair of tapered recesses 52 that is formed on the lower surface of the movable table 40 to face the positioning pins 51, and an air cylinder 53 that drives the positioning pins 51 along the vertical direction. The pair of positioning pins 51 are slidably engaged with the bushes 54 fixed to the lower side body portion 23 and moves towards the direction close to or away from the movable table 40.

The origin returning mechanism 50 allows the air cylinder 53 to operate and the pair of positioning pins 51 to move upward, so that the front ends of the tapers engage with the pair of tapered recesses 52, and the movable table 40 is returned to the origin position. Thus, even if the workpiece W is centered repeatedly, the position of the movable table 40 is returned to the original position by the origin returning mechanism 50 at each centering operation. Therefore, the movable distance of the movable table 40 may be ensured and the centering may be performed reliably.

As shown in FIG. 1 and FIG. 2, two stopper apparatuses 30 are arranged at intervals of 90 degrees in a circumferential direction on the sides of the air bearing slide 20 in the plane orthogonal to the center line CL of the rotational shaft 14. The axis center lines C of two horizontal moving mechanisms 32 are set to pass through the center line CL of the rotational tables 11.

Each of the stopper apparatuses 30 includes a fixed member 38, a supporting member 34 that moves along the vertical direction with respect to the fixed member 38 by a vertical moving mechanism 39, and an abutment member 31 moving along the horizontal direction with respect to the supporting member 34 via a horizontal moving mechanism 32. The vertical moving mechanism 39 includes a linear guide 37 that guides the supporting member 34 along the vertical direction, and a ball screw mechanism 36 that moves the supporting member 34 along the vertical direction by using the driving power of a servo motor (not shown). The horizontal moving mechanism 32 also includes a linear guide 33 that guides the abutment member 31 along the horizontal direction, and a ball screw mechanism (not shown) that moves the abutment member 31 along the vertical direction by using the driving power of a servo motor 35. The abutment member 31 includes an abutment portion 31a that is to abut against the circumferential surface of the workpiece W and can advance and retreat towards the center line CL and can move along the vertical direction by the horizontal moving mechanism 32 and the vertical moving mechanism 39.

Two stopper apparatuses 30 are independently controlled by a controller (not shown). For a plurality of workpieces W, the controller records positions of the abutment portion 31a where the center of each workpiece W coincides with the center of the rotational table 11. The servo motor 35 is controlled according to the workpiece W, so that the abutment portion 31a is located at the predetermined position for each workpiece W. By independently controlling the stopper apparatuses 30, errors such as circularity and uneven wall thickness of the workpiece W may be handled easily.

With respect to the two horizontal moving mechanisms 32 arranged at intervals of 90 degrees in the circumferential direction, a pressing apparatus 60 is arranged at the middle position of the farther side between the two horizontal moving mechanisms 32 separated at equal intervals of 135 degrees in the circumferential direction, and moves the workpiece W along a horizontal direction to abut against the abutment portions 31a of the stopper apparatuses 30 at the same time. Thereby, the center of the workpiece W coincides with the center of the rotational table 11, so that the workpiece W is centered.

When the workpiece W moves in a horizontal direction, the movable table 40 is slightly floated from the table body 22 due to the compression air discharged through the grooves 28, 29, and may move horizontally in any direction with little frictional resistance.

Next, the auto-centering method of the workpiece W for the auto-centering apparatus 10 will be described.

First, based on an instruction from the controller (not shown), the servo motor 35 of the stopper apparatuses 30 is operated, so that the two abutment portions 31a are moved in advance to a predetermined position according to the outer diameter and the height of the workpiece W. Next, the compression air supplied by the compressor and passed through the air passage 46 is discharged from the grooves 28, 29, so that the movable table 40 floats due to the pressure of the compression air with respect to the table body 22. Then, the air cylinder 53 of the origin returning mechanism 50 is operated, so that the pair of positioning pins 51 are engaged with the pair of tapered recesses 52 formed on the lower surface of the movable table 40, and the movable table 40 is returned to the origin position.

Then, the workpiece W is placed on the work placement surface 42a of the movable table 40 while avoiding contact with the two abutment portions 31a. Then, the pair of positioning pins 51 are lowered by operating the air cylinder 53, and the positioning pins 51 are disengaged from the tapered recesses 52. Incidentally, the positioning pins 51 may be lowered before the workpiece W is placed on the workpiece placement surface 42a.

Then, the workpiece W is pressed by the pressing apparatus 60 to move together with the movable table 40 along the horizontal direction without frictional resistance such that the workpiece W abuts against the abutment portion 31a of the two stoppers 30, so as to center the workpiece W. By way of stopping supplying the compression air to the grooves 28, 29, the centered movable table 40 is lowered to be placed onto the table body 22 and the abutment portions 31a of the two stopper apparatuses 30 are retreated to a retreat position. Thereafter, the movable table 11 is rotated by using the servo motor 17 and operations such as inspection and measurement are performed on the workpiece W.

As described above, according to the workpiece auto-centering apparatus 10 in the embodiment, the air bearing slide 20 includes the movable table 40 that has the workpiece placement surface 42a, on which the workpiece W is placed, and that floats due to the pressure of the compression air to be movable horizontally in any direction. Further, the workpiece auto-centering apparatus 10 includes the plurality of stopper apparatuses 30 that includes the abutment portions 31a against which a workpiece W can abut to center the workpiece W, and the pressing apparatus that presses the workpiece W such that the workpiece W abuts against the abutment portions 31a of the stopper apparatuses 30. Accordingly, the workpiece auto-centering apparatus 10 floats the movable table 40 due to the pressure of the compression air. Therefore, even a workpiece W with a large size and a heavy weight can move horizontally with extremely low frictional resistance. Moreover, compared with a workpiece auto-centering apparatus using hydraulic pressure, the workpiece auto-centering apparatus of the embodiment is unlikely to deteriorate the operating environment, and can be configured by simple a configuration. In addition, the workpiece auto-centering apparatus 10 performs centering by causing the workpiece to abut against the stopper apparatuses 30 without measuring the misalignment amount and direction, thereby shortening the cycle time.

Further, the plurality of stopper apparatuses 30 are provided at intervals of 90 degrees in the circumferential direction within a plane orthogonal to the rotational shaft 14 of the rotational table 11. Therefore, there is no need to make the misalignment direction of the workpiece W coincide with the direction of the horizontal moving mechanism as the conventional centering apparatus does. Rather, the workpiece W may be centered by one horizontal movement, and operation may be effectively performed in short time.

Furthermore, the positions of the abutment portions 31a are adjustable according to the outer diameter of the workpiece W, so that the stopper apparatuses 30 may be driven independently according to errors, such as circularity and uneven wall thickness of the workpiece W, etc. Further, the stopper apparatuses 30 may easily handle various types of the workpieces W.

Furthermore, the air bearing slide 20 includes the origin returning mechanism 50 that enables the movable table 40 to return to the predetermined origin position, so that the movable distance of the movable table 40 may be ensured, and the centering operation may be reliably performed.

Furthermore, the workpiece auto-centering method according to the present embodiment includes a step of supplying compression air to the air bearing slides 20 to float the movable table 40 by the pressure of the compression air, a step of placing a workpiece W onto the workpiece placement surface 42a of the movable table 40, a step of pressing the workpiece W by the pressing apparatus 60 to move the workpiece W together with the movable table 40 in the horizontal direction such that the workpiece W abuts against the abutment portion 31a of the stopper apparatus 30, so as to center the workpiece W, and a step of stopping supplying the compression air to the air bearing slides 20 to lower the movable table 40. Therefore, the workpiece auto-centering method causes the movable table 40 to float by the pressure of the compression air, and even large and higher weight workpieces W can be moved horizontally at an extremely low frictional force. In addition, compared with an auto-centering apparatus using hydraulic pressure, the workpiece auto-centering apparatus of the present embodiment is unlikely to deteriorate the operating environment, and can be configured by a simple configuration.

Furthermore, according to the auto-centering method, the cycle time is shortened by performing centering while causing the workpiece W to abut against the stopper apparatus 30 without measuring the misalignment amount and misalignment direction.

Moreover, the workpiece auto-centering apparatus method further includes a step of lifting the positioning pin 51 of the origin returning mechanism 50 and returning the movable table 40 to the predetermined origin position after a step of floating the movable table 40, and a step of lowering the positioning pin 51 of the origin returning mechanism 50, before or after the step of placing the workpiece W. Particularly, if the positioning pin 51 is lowered after the step of placing the workpiece W, the movable table 40 will not be deviated during placing the workpiece W, which allows that the workpiece W is placed stably on the workpiece placement surface 42a.

The present invention is not limited to the above-described embodiments and modified embodiments thereof, but may be appropriately modified, improved, or the like.

For example, in the above embodiment, four air bearing slides 20 are arranged around the center line CL at equal intervals (at intervals of 90 degrees), so that elastic deformation is alleviated which is caused by frictional force between the movable table 40 and the workpiece W. However, in the present invention, the number of the air bearing slides 20 is not defined.

Figure 4:
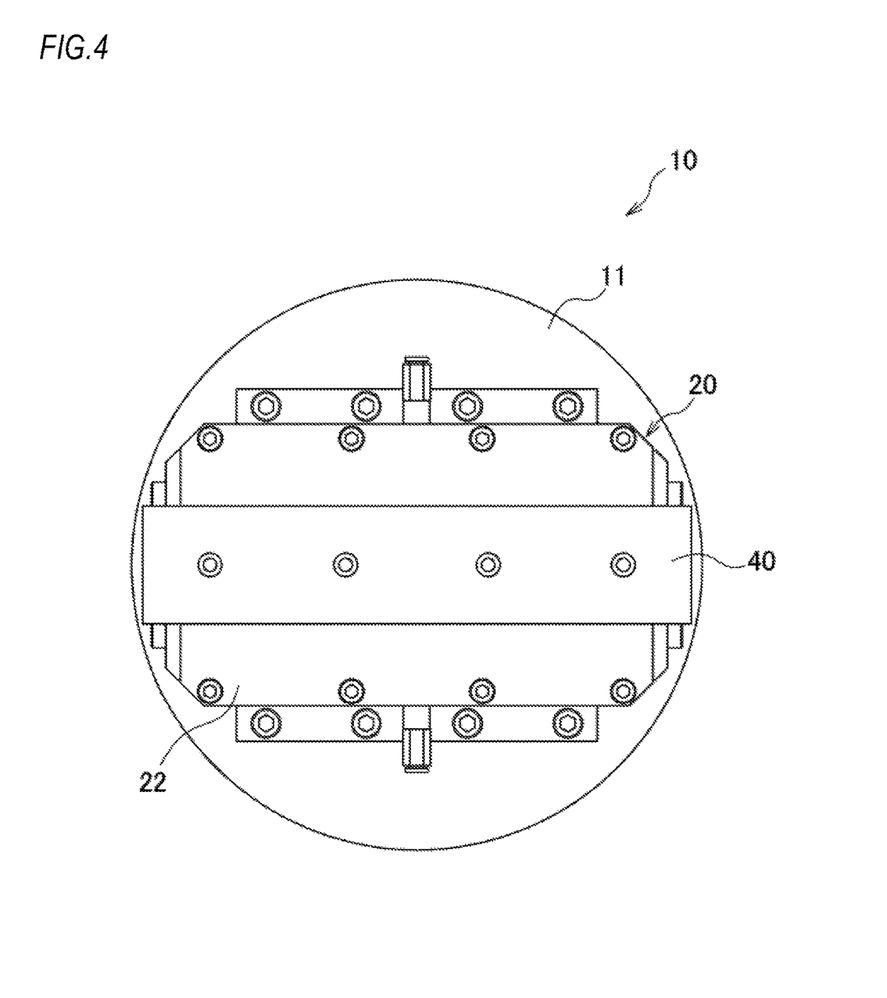
FIG. 4 is a plan view showing a configuration of a workpiece auto-centering apparatus according to a first modified embodiment.

For instance, in the case that the usage is limited to centering the workpiece W at an extremely low frictional force, a single air bearing slide 20 may be arranged at the middle of the rotational table 11 as the workpiece auto-centering apparatus 10 according to a first modified embodiment as shown in FIG. 4.

Figure 5:
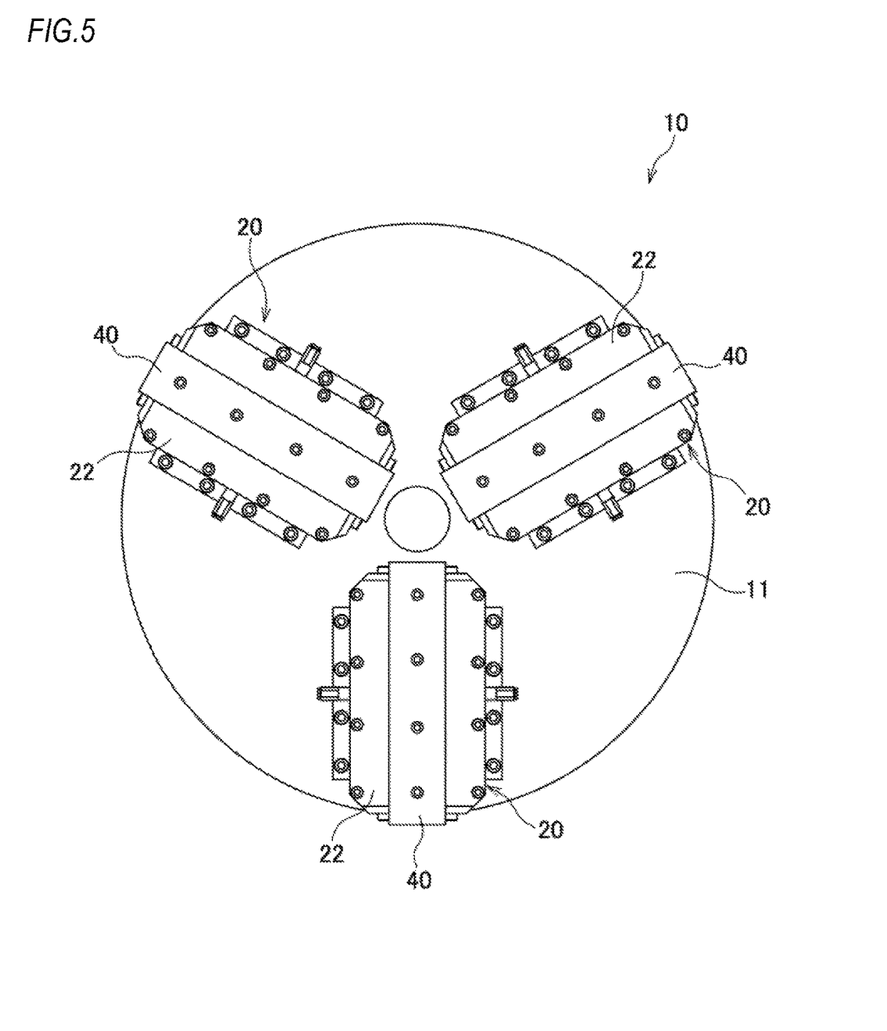
FIG. 5 is a plan view showing a configuration of a workpiece auto-centering apparatus according to a second modified embodiment.

Furthermore, according to the load capacity of the air bearing slides 20, three air bearing slides 20 may be arranged at intervals of 120 degrees as the workpiece auto-centering apparatus 10 according to a second modified embodiment as shown in FIG. 5.

The pressing apparatus 60 of the present invention may press the workpiece W as described in the embodiment, but may press the floatable movable table instead.

Further, if the stopper apparatus includes a member having two orthogonal planes configuring the abutment portions and is able to drive in the vertical direction and in the horizontal direction, the stopper apparatus may be only one.

This application is based on Japanese patent application No. 2014-116131 filed on Jun. 4, 2014, the content of which is incorporated herein by reference.

DESCRIPTION OF REFERENCE NUMERALS

10 Workpiece auto-centering apparatus
11 Rotational table
17 Servo motor (drive apparatus)
20 Air bearing slide (work table)
30 Stopper apparatus
31 Abutment member
40 Movable table
42 Work placement portion
42a Work placement surface
50 Origin returning mechanism
60 Pressing apparatus
CL Center line
W Workpiece

The invention claimed is:

1. A workpiece auto-centering apparatus for centering a workpiece, the workpiece auto-centering apparatus comprising:
a rotational table that is driven to rotate; and
at least one work table that is arranged on the rotational table and on which the workpiece is placed,
wherein the work table includes a movable table that has a workpiece placement surface for placing the workpiece thereon and that floats due to pressure of compression air to be movable horizontally in any direction,
wherein the work table includes an origin returning mechanism that enables the movable table to return to a predetermined origin position, and
wherein the origin returning mechanism includes a tapered recess that is formed on a lower surface of the movable table, and a positioning pin that has a tapered front end to be engageable with the tapered recess and is configured to move upward and downward,
the workpiece auto-centering apparatus further comprising:
at least one stopper apparatus that includes an abutment portion against which the workpiece abuts to position the workpiece; and
a pressing apparatus that presses the workpiece or the movable table such that the workpiece abuts against the abutment portion of the stopper apparatus.

2. The workpiece auto-centering apparatus according to claim 1,
wherein a plurality of stopper apparatuses are provided at intervals of 90 degrees in a circumferential direction within a plane orthogonal to a rotational shaft of the rotational table.

3. The workpiece auto-centering apparatus according to claim 1,
wherein a position of the abutment portion is adjustable according to an outer diameter of the workpiece.

4. An inspection or measurement apparatus comprising the workpiece auto-centering apparatus according to claim 1.

5. The workpiece auto-centering apparatus according to claim 1,
wherein the rotation table is separately provided from the stopper apparatus.

6. The workpiece auto-centering apparatus according to claim 1,
wherein the abutment portion of the stopper apparatus is movable in an upper-lower direction.

7. The workpiece auto-centering apparatus according to claim 1,
wherein two stopper apparatuses are provided at intervals of 90 degrees in a circumferential direction around the rotational table, and
wherein the pressing apparatus is arranged at a center position in the circumferential direction between the two stopper apparatuses at a further side from the two stopper apparatuses.

8. The workpiece auto-centering apparatus according to claim 1,
wherein the abutment portion is configured to advance and retreat towards a centerline around which the rotational table rotates.

9. The workpiece auto-centering apparatus according to claim 8,
wherein the abutment portion is moved to a predetermined position according to an outer diameter and a height of the workpiece before the compression air is supplied and is retreated to a retreat position after the workpiece is centered.

10. A workpiece auto-centering method using a workpiece auto-centering apparatus, the workpiece auto-centering apparatus comprising a rotational table that is driven to rotate; at least one work table that is arranged on the rotational table and on which the workpiece is placed, wherein the work table includes a movable table that has a workpiece placement surface for placing the workpiece thereon and that floats due to pressure of compression air to be movable horizontally in any direction, at least one stopper apparatus that includes an abutment portion against which the workpiece abuts to position the workpiece; and a pressing apparatus that presses the workpiece or the movable table such that the workpiece abuts against the abutment portion of the stopper apparatus, the method comprising:
- a step of supplying compression air to the work table to float the movable table by pressure of the compression air;
- a step of placing the workpiece onto the workpiece placement surface of the movable table;
- a step of pressing the workpiece or the movable table by the pressing apparatus to move the workpiece together with the movable table in a horizontal direction such that the workpiece abuts against the stopper apparatus, so as to center the workpiece;
- a step of stopping supplying the compression air to the work table to lower the movable table;
- a step of moving the abutment portion to a predetermined position according to an outer diameter and a height of the workpiece before the step before supplying compression air; and
- a step of retreating the abutment portion to a retreat position after the step of stopping supplying the compression air.

11. The workpiece auto-centering method according to claim 10,
wherein the work table includes an origin returning mechanism that enables the movable table to return to a predetermined origin position,
the workpiece auto-centering method further comprising:
- a step of lifting a positioning pin of the origin returning mechanism and returning the movable table to the predetermined origin position after the step of floating the movable table; and
- a step of lowering the positioning pin of the origin returning mechanism before or after the step of placing the workpiece.

12. An inspection or measurement method comprising the workpiece auto-centering method according to claim 10.

13. A workpiece auto-centering method using a workpiece auto-centering apparatus, the workpiece auto-centering apparatus comprising a rotational table that is driven to rotate; and at least one work table that is arranged on the rotational table and on which the workpiece is placed, wherein the work table includes a movable table that has a workpiece placement surface for placing the workpiece thereon and that floats due to pressure of compression air to be movable horizontally in any direction, wherein the work table includes an origin returning mechanism that enables the movable table to return to a predetermined origin position, and wherein the origin returning mechanism includes a tapered recess that is formed on a lower surface of the movable table, a positioning pin that has a tapered front end to be engageable with the tapered recess and is configured to move upward and downward, at least one stopper apparatus that includes an abutment portion against which the workpiece abuts to position the workpiece; and a pressing apparatus that presses the workpiece or the movable table such that the workpiece abuts against the abutment portion of the stopper apparatus,
the method comprising:
- a step of supplying compression air to the work table to float the movable table by pressure of the compression air;
- a step of placing the workpiece onto the workpiece placement surface of the movable table;
- a step of pressing the workpiece or the movable table by the pressing apparatus to move the workpiece together with the movable table in a horizontal direction such that the workpiece abuts against the stopper apparatus, so as to center the workpiece;
- a step of stopping supplying the compression air to the work table to lower the movable table;
- a step of lifting the positioning pin of the origin returning mechanism and returning the movable table to the predetermined origin position after the step of floating the movable table; and
- a step of lowering the positioning pin of the origin returning mechanism before or after the step of placing the workpiece.

14. A workpiece auto-centering apparatus for centering a workpiece, the workpiece auto-centering apparatus comprising:
- a rotational table that is driven to rotate; and
- at least one work table that is arranged on the rotational table and on which the workpiece is placed,
wherein the work table includes a movable table that has a workpiece placement surface for placing the workpiece thereon and that floats due to pressure of compression air to be movable horizontally in any direction,
the workpiece auto-centering apparatus further comprising:
- at least one stopper apparatus that includes an abutment portion against which the workpiece abuts to position the workpiece; and
- a pressing apparatus that presses the workpiece or the movable table such that the workpiece abuts against the abutment portion of the stopper apparatus,
wherein the abutment portion of the stopper apparatus is movable in an upper-lower direction.

* * * * *